United States Patent
Pan et al.

(10) Patent No.: US 12,217,477 B2
(45) Date of Patent: Feb. 4, 2025

(54) OBJECT RECOGNITION METHOD AND APPARATUS

(71) Applicant: HUAWEI TECHNOLOGIES CO., LTD., Guangdong (CN)

(72) Inventors: Gang Pan, Hangzhou (CN); Qianhui Liu, Hangzhou (CN); Lei Jiang, Hangzhou (CN); Jie Cheng, Shenzhen (CN); Haibo Ruan, Hangzhou (CN); Dong Xing, Hangzhou (CN); Huajin Tang, Hangzhou (CN); De Ma, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 17/680,668

(22) Filed: Feb. 25, 2022

(65) Prior Publication Data
US 2022/0180619 A1   Jun. 9, 2022

Related U.S. Application Data

(63) Continuation of application No. PCT/CN2020/111650, filed on Aug. 27, 2020.

(30) Foreign Application Priority Data

Aug. 30, 2019   (CN) .......................... 201910818551.1

(51) Int. Cl.
 *G06V 10/62* (2022.01)
 *G06N 3/049* (2023.01)
 (Continued)

(52) U.S. Cl.
 CPC ............. *G06V 10/62* (2022.01); *G06N 3/049* (2013.01); *G06V 10/454* (2022.01); *G06V 10/77* (2022.01)

(58) Field of Classification Search
 CPC ...... G06V 10/62; G06V 10/454; G06V 10/77; G06N 3/049
 See application file for complete search history.

(56) References Cited

U.S. PATENT DOCUMENTS

| 10,567,679 | B2 | 2/2020 | Berner et al. |
| 10,715,750 | B2 | 7/2020 | Berner et al. |

(Continued)

FOREIGN PATENT DOCUMENTS

| CN | 105469039 A | 4/2016 |
| CN | 105721772 A | 6/2016 |

(Continued)

OTHER PUBLICATIONS

Peng X, Zhao B, Yan R, et al. Bag of events: an efficient probability-based feature extraction method for AER image sensors[J]. IEEE Trans. Neural Netw. Learning Syst., 2017, 28(4): 791-803.

(Continued)

*Primary Examiner* — Shefali D Goradia

(57) ABSTRACT

In an object recognition method, an object recognition device obtains AER data of a to-be-recognized object, wherein the AER data includes a plurality of AER events of the to-be-recognized object, each AER event comprising a timestamp and address information. The object recognition device extracts a plurality of feature maps of the AER data. Each feature map including partial spatial information and partial temporal information of the to-be-recognized object, and the partial spatial information and the partial temporal information are obtained based on the timestamp and the address information of each AER event. The object recognition device then recognizes the to-be-recognized object based on the plurality of feature maps of the AER data.

8 Claims, 4 Drawing Sheets

(51) Int. Cl.
*G06V 10/44* (2022.01)
*G06V 10/77* (2022.01)

(56) References Cited

U.S. PATENT DOCUMENTS

| | | | |
|---|---|---|---|
| 2015/0372805 A1 | 12/2015 | Yoon | |
| 2016/0093273 A1 | 3/2016 | Wang et al. | |
| 2018/0357504 A1 | 12/2018 | Zamir et al. | |
| 2021/0044742 A1* | 2/2021 | Berkovich | H04N 25/50 |
| 2021/0142086 A1* | 5/2021 | Berkovich | H04N 25/79 |
| 2021/0227014 A1* | 7/2021 | Boukhtouta | H04W 4/029 |

FOREIGN PATENT DOCUMENTS

| | | | |
|---|---|---|---|
| CN | 106407990 A | 2/2017 | |
| CN | 106446907 A | 2/2017 | |
| CN | 106446937 A | 2/2017 | |
| WO | WO-2018176986 A1 * | 10/2018 | H04N 5/357 |

OTHER PUBLICATIONS

Qianhui Liu et al., Unsupervised AER Object Recognition Based on Multiscale Spatio-Temporal Features and Spiking Neurons , IEEE Transactions on Neural Networks and Learning Systems (CCF-B), 2019, 11 pages.

Zhao B, Ding R, Chen S, et al. Feedforward Categorization on AER Motion Events Using Cortex-Like Features in a Spiking Neural Network[J]. IEEE Trans. Neural Netw. Learning Syst., 2015, 26(9): 1963-1978.

Butts, D. A.; Weng, C.; Jin, J.; Yeh, C.-I.; Lesica, N. A.; Alonso, J.-M.; and Stanley, G. B. 2007. Temporal precision in the neural code and the timescales of natural vision. Nature 449(7158):92.

Panzeri, S.; Brunel, N.; Logothetis, N. K.; and Kayser, C. 2010. Sensory neural codes using multiplexed temporal scales. Trends in Neurosciences 33(3):111 120.

Ma Yuhao et al: "An Event-Driven Computational System withSpiking Neurons for Object Recognition", Oct. 26, 2017(Oct. 26, 2017), SAT 2015 18th International Conference, Austin, TX, USA, Sep. 24-27, 2015; [Lecture Notesin Computer Science; Lect.Notes Computer], Springer, Berlin, Heidelberg, pp. 453-461,XP047453858, ISBN: 978-3-540-74549-5[retrieved on Oct. 26, 2017].

Zheng Yajing et al: "Sparse Temporal Encoding of VisualFeatures for Robust Object Recognition by Spiking Neurons", IEEE Transactions on Neural Networks Andlearning Systems, IEEE, USA,vol. 29, No. 12, Dec. 1, 2018 (Dec. 1, 2018), pp. 5823-5833,XP011697735, ISSN: 2162-237X, DOI: 10.1109/TNNLS.2018.2812811[retrieved on Nov. 19, 2018].

Lagorce Xavier et al: "HOTS: A Hierarchy of Event-BasedTime-Surfaces for Pattern Recognition", IEEE Transactions on Pattern Analysis and Machineintelligence, IEEE Computer Society, USA,vol. 39, No. 7, Jul. 1, 2017 (Jul. 1, 2017), pp. 1346-1359,XP011651260,ISSN: 0162-8828, DOI: 10.1109/TPAMI.2016.2574707[retrieved on Jun. 2, 2017].

Sironi Amos et al: "HATS: Histograms of Averaged TimeSurfaces for Robust Event-Based Object Classification",2018 IEEE/CVF Conference on Computer Vision andpattern Recognition, IEEE, Jun. 18, 2018 (Jun. 18, 2018),pp. 1731-1740, XP033476137,DOI: 10.1109/CVPR.2018.00186[retrieved on Dec. 14, 2018].

* cited by examiner

OBJECT RECOGNITION METHOD AND APPARATUS

CROSS-REFERENCE TO RELATED APPLICATIONS

This application is a continuation of International Application No. PCT/CN2020/111650, filed on Aug. 27, 2020, which claims priority to Chinese Patent Application No. 201910818551.1, filed on Aug. 30, 2019. The disclosures of the aforementioned applications are hereby incorporated by reference in their entirety.

TECHNICAL FIELD

This application relates to the field of image processing technologies, and in particular, to an object recognition method and apparatus.

BACKGROUND

"Frame scanning" is an image collection manner of a conventional vision sensor. In actual application, as vision systems impose higher requirements on performance metrics such as speed, the conventional vision sensor encounters development bottlenecks such as massive data and a limited frame rate. With advantages of high speed, low delay and low redundancy, an address event representation (AER) sensor based on a bionic vision perception model currently has become a research hotspot in the field of machine vision systems. Each pixel in the AER sensor separately monitors a relative change in light intensity of a specific area. If the change exceeds a predefined threshold, an AER event corresponding to the pixel is recorded. The AER event includes a location (namely, address information) of the pixel, time (namely, a timestamp) when the event is sent, and indication information indicating an increase or a decrease in a value of the light intensity. Different from the conventional vision sensor that records the value of the light intensity all the time, the AER sensor records only an event in which a change value of the light intensity exceeds the threshold, and does not record an event in which a change value of the light intensity is less than the threshold. Therefore, redundancy of visual information can be greatly reduced.

In a related technology, it is assumed that pixels in the AER sensor are 128×128. When an object in AER data is recognized, a spatial feature of the AER data is first extracted, and an AER event in the AER data is input into a spatial feature extraction algorithm, where an output is a 128×128 spatial feature map (namely, the spatial feature). The spatial feature map is then input into a classification algorithm to recognize the object in the AER data.

Only the spatial feature is considered in the related technology, and the extracted feature is relatively simple. Therefore, when the AER data is recognized, a recognition result may be inaccurate.

SUMMARY

To resolve a problem that an object recognition result is inaccurate, this application provides an object recognition method and apparatus.

According to a first aspect, this application provides an object recognition method. In the method, in an object recognition process, AER data of a to-be-recognized object may be obtained, where the AER data includes a plurality of AER events of the to-be-recognized object, and each AER event includes a timestamp (namely, time when the AER event occurs) and address information (namely, location information of a pixel generating the AER event) that are used for generating the AER event. Then, a plurality of feature maps of the AER data may be extracted, where each feature map includes partial spatial information and partial temporal information of the to-be-recognized object, and the partial spatial information and the partial temporal information are obtained based on the timestamp and the address information of each AER event. The to-be-recognized object is recognized based on the plurality of feature maps of the AER data.

In the object recognition method provided in this application, temporal information and address information of the AER events are extracted when the feature maps of the AER data are extracted, so that both temporal information and spatial information of the original AER data are included in the extracted feature maps. In this way, the feature maps can more comprehensively represent the original data, and a recognition result can be more accurate when the to-be-recognized object is recognized.

In a possible implementation, extracting the plurality of feature maps of the AER data includes: processing the address information of the plurality of AER events by using a plurality of filters, to obtain a plurality of first feature maps; and attenuate feature values in the plurality of first feature maps based on timestamps of the plurality of AER events, to obtain the plurality of feature maps of the AER data.

In the solution shown in this application, when the plurality of feature maps of the AER data are extracted, the plurality of filters may be obtained. The filter may be a Gabor filter or a difference of Gaussian (DOG) filter. When the filter is the Gabor filter, the plurality of filters are filters with combinations of different directions and scales. The scale is a size of a convolution kernel, and the direction is a direction of a kernel function of the Gabor filter. The different directions and scales mean that at least one of the scales and the directions is different.

For any filter, the filter may be used to process the address information of the plurality of AER events (where the processing may be convolution processing), to obtain one first feature map. In this way, because there is a plurality of filters, a plurality of first feature maps may be obtained (where the plurality of first feature maps have a same size and are all n×m). Then, attenuation as a function of time is performed on the feature value in each of the plurality of first feature maps based on the timestamps of the AER events, to obtain the plurality of feature maps of the AER data.

In a possible implementation, the processing the address information of the plurality of AER events by using a plurality of filters, to obtain a plurality of first feature maps includes: performing convolution processing on spatial information of the plurality of AER events by using convolution kernels of a plurality of Gabor filters, to obtain the plurality of first feature maps.

In the solution shown in this application, when the first feature maps are extracted, convolution processing may be performed on the spatial information of the AER events by using the convolution kernel of each Gabor filter, to obtain a first feature map corresponding to the convolution kernel of each Gabor filter. In this way, because there is a plurality of Gabor filters, a plurality of first feature maps may be obtained.

In a possible implementation, that the to-be-recognized object is recognized based on the plurality of feature maps of the AER data includes: encoding the plurality of feature maps of the AER data to obtain a plurality of spike trains, and processing the plurality of spike trains by using a spiking neural network, to recognize the to-be-recognized object. Each spike train includes a plurality of spikes, and each spike carries partial temporal information and partial spatial information of the to-be-recognized object. A plurality of spikes belonging to a same spike train are obtained based on feature values at same locations in feature maps corresponding to different filters that are in a same specified direction.

In the solution shown in this application, when the to-be-recognized object is recognized, the plurality of feature maps of the AER data may be encoded to obtain the plurality of spike trains. Specifically, a feature value in each feature map may be encoded into a spike time. When the spike time is encoded or at other time, the feature values at the same locations in the feature maps, corresponding to the different filters that are in the specified direction, in the plurality of feature maps form a group of feature values (where the specified direction is any direction of the filter). Then, spike times corresponding to the group of feature values are formed into a spike train. In this way, different directions of each location in the feature map correspond to different spike trains, and a plurality of spike trains may be obtained. Each spike train includes a plurality of spikes. Because the feature value in the feature map carries partial temporal information and partial spatial information of the to-be-recognized object, the spike also carries the partial temporal information and the partial spatial information of the to-be-recognized object. Then, the spike train is input into the spiking neural network to identify an object included in the AER data.

In this way, because the spike train is obtained through encoding, and each spike in the spike train expresses temporal information and spatial information, a recognition result can be more accurate during recognition. Moreover, because spikes with different scales are fused, a quantity of recognition neurons in the spiking neural network can be reduced but accuracy is maintained, to further reduce computing resources.

In a possible implementation, the plurality of feature maps of the AER data may be encoded by using a target coding function, to obtain the plurality of spike trains. The target coding function is an inverse linear function or an inverse logarithmic function. The target coding function is used to control a relatively small feature value in the feature map to trigger a spike later or not to trigger a spike, and is used to control a relatively large feature value in the feature map to trigger a spike earlier.

In this way, because distribution of feature values in the feature map is changed by using the target coding function, more information can be expressed during subsequent recognition, and recognition accuracy can be improved.

According to a second aspect, this application provides an object recognition apparatus. The apparatus includes one or more modules, and the one or more modules are configured to implement the object recognition method provided in the first aspect or the possible implementations of the first aspect.

According to a third aspect, this application provides an object recognition computing device. The computing device includes a processor and a communications interface, and the processor is connected to the communications interface.

The communications interface is configured to receive AER data of a to-be-recognized object. The processor is configured to perform the object recognition method according to the first aspect.

According to a fourth aspect, this application provides a computer-readable storage medium. The computer-readable storage medium stores instructions. When the instructions in the computer-readable storage medium are executed on a computing device, the computing device is enabled to perform the object recognition method provided in the first aspect or the possible implementations of the first aspect.

According to a fifth aspect, this application provides a computer program product including instructions. When the computer program product runs on a computing device, the computing device is enabled to perform the object recognition method provided in the first aspect or the possible implementations of the first aspect.

DESCRIPTION OF EMBODIMENTS

Figure 1:
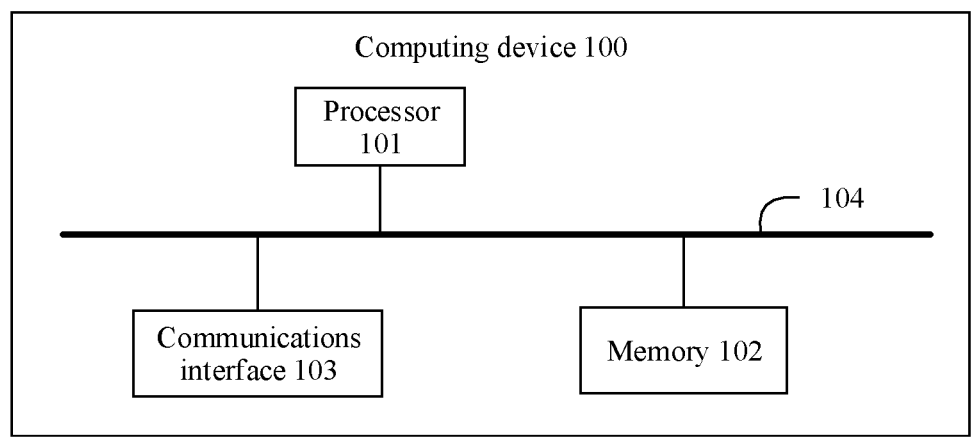
FIG. 1 is a structural block diagram of a computing device according to an example embodiment of this application.

To make the objectives, technical solutions, and advantages of this application clearer, the following further describes the implementations of this application in detail with reference to the accompanying drawings.

For ease of understanding of the embodiments of this application, the following first describes concepts of related nouns.

An AER sensor is a neuromorphic apparatus simulating a human retinal mechanism. The AER sensor includes a plurality of pixels, and each pixel separately monitors a change in light intensity of a specific area. When the change exceeds a threshold, an AER event corresponding to the pixel is recorded, and when the change does not exceed the threshold, the AER event corresponding to the pixel is not recorded. Each AER event includes location information (namely, address information) of a pixel in which the AER event occurs, time (namely, a timestamp) when the AER event occurs, and a polarity. The polarity is used to represent whether a change in light perceived by the pixel is from dark to bright (which may be represented by a value 1) or from light to dark (which may be represented by a value −1). It may be learned that the AER sensor finally outputs the AER event from each pixel. Compared with a conventional camera, the AER sensor has advantages of asynchronization, high temporal resolution, and sparse representation of a scenario, and has great advantages in a data transmission speed and data redundancy. It should be noted that the asynchronization of the scenario means that each pixel separately collects the AER event.

AER data includes an AER event flow from each pixel. Any AER event in the AER event flow from each pixel includes address information of a pixel in which the AER event occurs, a timestamp about occurrence of the AER event, a polarity, and the like.

A Gabor filter is a linear filter used for texture analysis. The Gabor filter may be configured to extract a feature of an image or a video, and is widely used in computer vision applications. Specifically, only a texture corresponding to a frequency of the Gabor filter is allowed to pass smoothly, and energy of another texture is suppressed. The Gabor filter may be represented by a scale s and a direction θ. Combinations of different scales s and directions θ correspond to different convolution kernels. Therefore, the combinations of different scales s and directions θ correspond to different filters. Studies have shown that simple cells in a visual cortex of a mammalian brain can be modeled by Gabor filters, and each Gabor filter simulates a neuron cell having a specific scale of receptive field. The receptive field is a stimulation area reflected or dominated by a neuron.

A spiking neural network (SNN) is often referred to as a third-generation artificial neural network. A neuron in the spiking neural network can simulate a voltage change and transfer process of a biological nerve cell. Information transfer between neurons is in a form of a spike, and the spike includes temporal and spatial information. The spiking neural network can be used to recognize and classify inputs.

A spike-time dependent plasticity (STDP) algorithm is an update rule for a connection weight between neurons found in the brain, and a goal is that the closer two neurons fire in time, the closer a binding relationship between the two neurons. The STDP algorithm is an unsupervised learning algorithm.

The unsupervised learning algorithm plays a dominant role in human and animal learning, and people may discover an inner structure of the world through observation instead of being told a name of every objective thing. A design of the unsupervised learning algorithm is mainly for training of unlabeled datasets, and requires an unsupervised learning rule to be applied to adaptively adjust a connection weight or structure of the neural network. In other words, without supervision of a "teacher" signal, the neural network should discover regularity (such as a statistical feature, a correlation, or a category) from input data and implement classification or decision-making through an output.

A supervised learning algorithm is a process in which parameters of a group of sample adjustment classifiers with known categories are used to achieve required performance of the classifiers, and is also referred to as supervised training. In other words, the supervised learning is a machine learning task that infers a function from labeled training data.

Before an object recognition method provided in the embodiments of this application is described, an application scenario and a system architecture to which the embodiments of this application are applicable are described.

After image data is obtained by using an AER sensor, an object in the image data is usually recognized. The object may be an object such as a pedestrian or a vehicle, or may be an action process, or the like. In a related technology, a spatial feature of AER data is extracted from data output by the AER sensor, and then a to-be-recognized object in the AER data is recognized based on the spatial feature. Only the spatial feature is considered, and the extracted feature is relatively simple. Therefore, when the AER data is recognized, a recognition result may be inaccurate. In this case, a relatively accurate recognition method needs to be provided. The AER sensor in the embodiments of this application may be applied to any image shooting scenario in which changed content is mainly recorded, such as a driving recorder or a monitoring device.

The object recognition method provided in the embodiments of this application may be performed by an object recognition apparatus, and the object recognition apparatus may be a hardware apparatus, for example, a server or a terminal computing device. The object recognition apparatus may alternatively be a software apparatus, and is specifically a set of software systems running on a hardware computing device. A deployment location of the object recognition apparatus is not limited in the embodiments of this application. For example, the object recognition apparatus may be deployed on a server.

Logically, the object recognition apparatus may alternatively be an apparatus including a plurality of components. For example, the object recognition apparatus may include an obtaining module, an extraction module, a recognition module, and the like. The components in the object recognition apparatus may be separately deployed in different systems or servers. The components in the apparatus may separately run in three environments: a cloud computing device system, an edge computing device system, and a terminal computing device, or may run in any two of the three environments. The cloud computing device system, the edge computing device system, and the terminal computing device are connected through a communication channel, and may communicate with each other.

When the object recognition apparatus is a computing device, FIG. 1 provides an example of a possible architectural diagram of a computing device 100 according to this application.

The computing device 100 may include a processor 101, a memory 102, a communications interface 103, and a bus 104. In the computing device 100, there may be one or more processors 101. FIG. 1 shows only one of the processors 101. Optionally, the processor 101 may be a central processing unit (CPU). If the computing device 100 includes a plurality of processors 101, the plurality of processors 101 may be of a same type or different types. Optionally, the plurality of processors of the computing device 100 may be integrated into a multi-core processor. The processor 101 may be configured to perform steps in the object recognition method. In actual application, the processor 101 may be an ultra-large-scale integrated circuit. An operating system and another software program are installed on the processor 101, so that the processor 101 can access a component such as the memory 102. It may be understood that, in this embodiment of the present invention, the processor 101 is described as a central processing unit (CPU). In actual application, the processor 101 may be another application-specific integrated circuit (ASIC).

The memory 102 stores computer instructions and data. The memory 102 may store computer instructions and data that are required for implementing the object recognition method provided in this application. For example, the memory 102 stores instructions used for performing, by the obtaining module, a step in the object recognition method provided in this application. For another example, the memory 102 stores instructions used for performing, by the extraction module, a step in the object recognition method provided in this application. For another example, the memory 102 stores instructions used for performing, by the recognition module, a step in the object recognition method provided in this application. The memory 102 may be any one or any combination of the following storage media: a non-volatile memory (for example, a read-only memory (ROM), a solid state disk (SSD), a hard disk drive (HDD), an optical disc) or a volatile memory.

The communications interface 103 may be any one or any combination of the following components with a network access function, such as a network interface (for example, an Ethernet interface) and a wireless network interface card. The communications interface 103 is configured to perform data communication between the computing device 100 and another computing device 100 or a terminal. In this application, AER data of the to-be-recognized object may be obtained from the AER sensor through the communications interface 103.

A thick line is used to represent the bus 104 in FIG. 1. The processor 101, the memory 102, and the communications interface 103 may be connected through the bus 104. In this way, through the bus 104, the processor 101 may access the memory 102, and may further exchange data with the another computing device 100 or the terminal through the communications interface 103.

In this application, the computing device 100 executes the computer instructions in the memory 102, so that the computing device 100 is enabled to implement the object recognition method provided in this application. For example, the computing device 100 is enabled to perform the step performed by the obtaining module in the object recognition method. For another example, the computing device 100 is enabled to perform the step performed by the extraction module in the object recognition method. For another example, the computing device 100 is enabled to execute an instruction of the step performed by the recognition module in the object recognition method.

Figure 2:
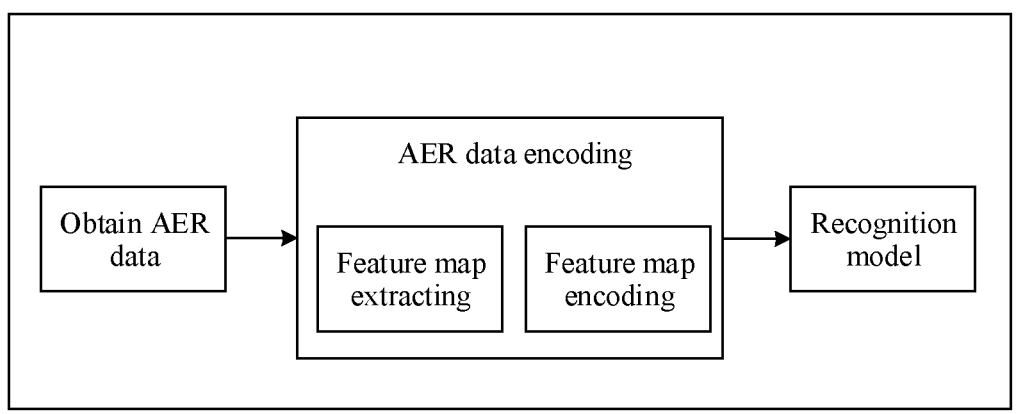
FIG. 2 is a schematic diagram of an architecture of an object recognition method according to an example embodiment of this application.

Before implementation, an overall framework of the embodiments of this application is first described. An embodiment of this application provides an object recognition method. An implementation diagram of the method is shown in FIG. 2. An object recognition apparatus obtains, from an AER sensor, AER data collected by the AER sensor. The object recognition apparatus performs encoding processing on the AER data, and the encoding processing may include extracting a plurality of feature maps of the AER data and performing encoding processing on the plurality of feature maps of the AER data. The object recognition apparatus inputs encoded content into a recognition model for recognition.

Figure 3:
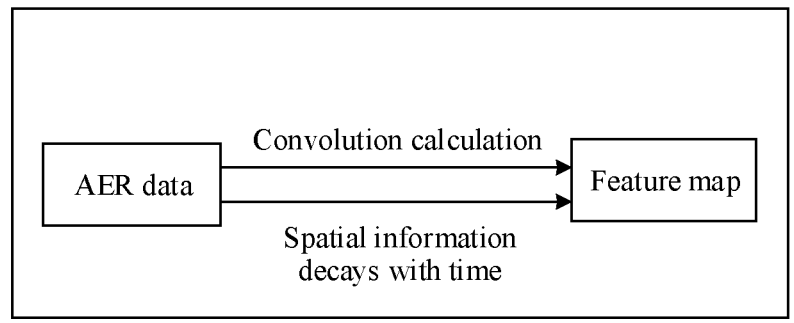
FIG. 3 is a schematic diagram of an architecture of extracting a feature map according to an example embodiment of this application.

In FIG. 2, a processing process of extracting the feature map may be shown in FIG. 3. The object recognition apparatus performs convolution calculation on the AER data, and spatial information of the AER data is attenuated with time, so that each feature value in each feature map is affected by a timestamp of an AER event.

Figure 4:
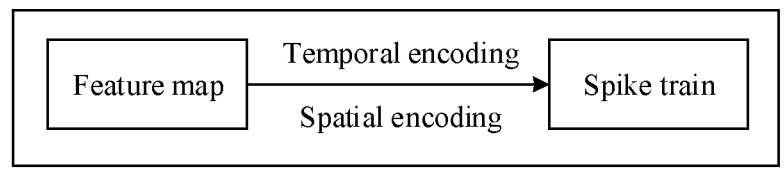
FIG. 4 is a schematic diagram of an architecture of encoding a feature map according to an example embodiment of this application.

In FIG. 2, a processing process of encoding the feature map may be shown in FIG. 4. After performing temporal encoding on the feature value in the feature map by using a coding function, the object recognition apparatus generates a spike time. When performing temporal encoding, the object recognition apparatus may perform spatial encoding at the same time. Specifically, feature values, with different scales in a specified direction, at same locations in the plurality of feature maps of the AER data form a group (where the specified direction is described later), to obtain a plurality of groups of feature values. Then, spike times corresponding to each group of feature values are determined, to obtain a group of spike times corresponding to each group of feature values. Each group of spike times is a spike train. In other words, each spike train includes a plurality of spikes.

It should be noted that the feature maps with the different scales in the specified direction are feature maps obtained by using different filters in the specified direction. For example, there are four filters in a 45-degree direction θ (where 4 represents a quantity of scales), and four feature maps are obtained by the filters in the specified 45-degree direction. The same location refers to a same location in a plurality of feature maps. For example, the same location could be identified by a location giving coordinates (4, 4) in each feature map.

In addition, a filter is used when the feature map is extracted in this embodiment of this application. The filter may be any filter that can extract a feature, for example, may be a Gabor filter or a DOG filter. Before implementation, to better understand this embodiment of this application, the Gabor filter is first described. A function expression of the Gabor filter may be:

$$G(\Delta x, \Delta y, s, \theta) = \exp\left(-\frac{X^2 + \gamma Y^2}{2\sigma^2}\right)\cos\left(\frac{2\pi}{\lambda}X\right) \quad (1)$$

In the formula (1), X=Δx cos θ+Δy sin θ, and Y=−Δx sin θ+Δy cos θ. (Δx, Δy) is a spatial offset location between (x, y) and a location $(e_x, e_y)$ of a pixel to which the AER event belongs. (x, y) is a location, in the feature map, that corresponds to an element in a convolution kernel corresponding to the Gabor filter. Actually, $(e_x, e_y)$ may also be considered as a location of the AER event in the feature map.

γ is a spatial aspect ratio, and determines a shape of the Gabor filter. When a value of γ is 1, the shape is circular.

λ is a wavelength, and directly affects a filtering scale of the Gabor filter (namely, a scale mentioned later). σ represents a bandwidth, and is a variance of the Gabor filter. λ and σ are determined by a scale s.

The scale s represents a size of the convolution kernel of the Gabor filter. For example, the scale s is 3, and the convolution kernel is a 3×3 convolution kernel. Alternatively, the scale s is 5, and the convolution kernel is a 5×5 convolution kernel.

θ represents a direction of a kernel function of the Gabor filter.

When the scale s and the direction θ are fixed, a convolution kernel with the scale s and the direction θ can be calculated by using the function expression of the Gabor filter. For example, the scale s is 3, the direction is 45 degrees, and the location of the pixel to which the AER event belongs is (3, 3) (in other words, the location in the feature map is (3, 3)). To calculate a value at a location (1, 1) in the convolution kernel, x=2, y=2, Δx=−1, and Δy=−1. Δx and Δy are substituted into the formula (1) to obtain G(−1, −1), namely, the value at the location (1, 1) in the convolution kernel. In this way, each convolution kernel with a combination of the scale s and the direction θ can be determined.

Figure 5:
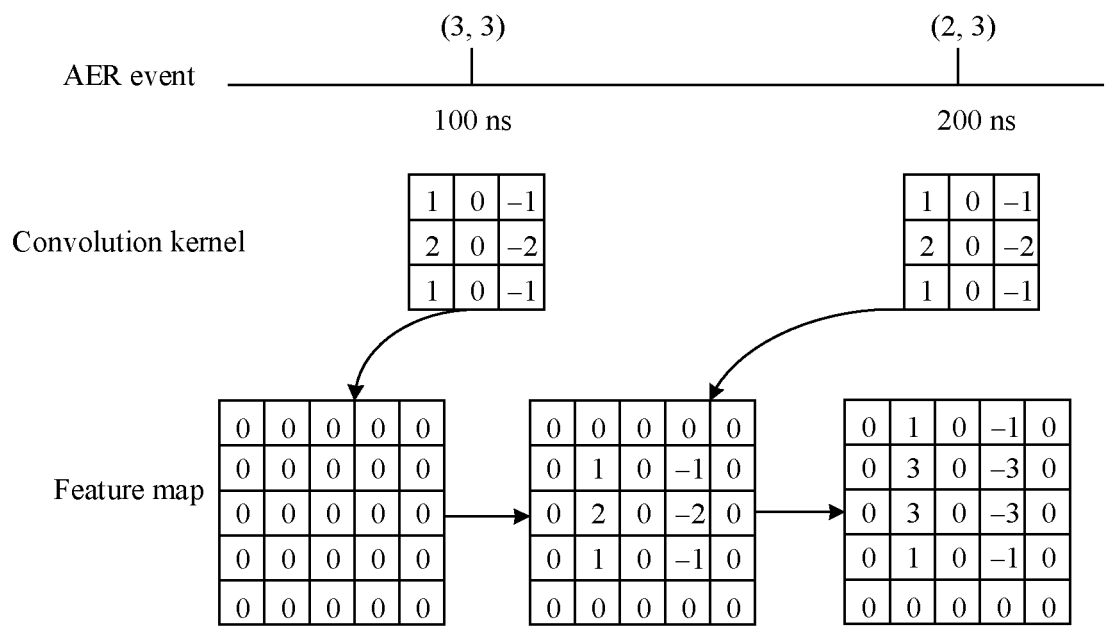
FIG. 5 is a schematic diagram of extracting a feature map according to an example embodiment of this application.

After the convolution kernel is determined, the feature map is extracted by using the convolution kernel. A quantity of feature values included in the feature map is the same as a quantity of pixels in the AER sensor. A quantity of feature values in each row of the feature map is the same as a quantity of pixels in each row of the AER sensor, and the feature values and the pixels are in a one-to-one correspondence. A value of each feature value in an initial feature map may be zero. For example, if the quantity of pixels in the AER sensor is 5×5, the quantity of feature values included in the feature map is 5×5. When the scale s and the direction θ are fixed, each time convolution processing is performed on an AER event, the convolution kernel corresponding to the scale s and the direction θ is covered into a receptive field of a location of the AER event in the feature map. Specifically, it is assumed that the convolution kernel is $$\begin{bmatrix} a & b & c \\ d & e & f \\ g & h & i \end{bmatrix},$$

and the location of the AER event in the feature map is (m, n). A value e at a central location of the convolution kernel is superimposed on a feature value at a location (m, n) in the feature map. Then, a is superimposed on a feature value at a location (m−1, n−1) in the feature map, b is superimposed on a feature value at a location (m, n−1) in the feature map, c is superimposed on a feature value at a location (m+1, n−1) in the feature map, and so on. In this way, the convolution kernel may be covered into the feature map, to obtain a feature map to which the AER event is added. As shown in FIG. 5, it is assumed that the convolution kernel is 3×3, that is, $$\begin{bmatrix} 1 & 0 & -1 \\ 2 & 0 & -2 \\ 1 & 0 & -1 \end{bmatrix};$$

the initial feature map is 5×5, that is, $$\begin{bmatrix} 0 & 0 & 0 \\ 0 & 0 & 0 \\ 0 & 0 & 0 \\ 0 & 0 & 0 \\ 0 & 0 & 0 \end{bmatrix};$$

an AER event is input at a pixel location (3, 3) when time is 100 ns; and an AER event is input at a pixel location (2, 3) when the time is 200 ns. The object recognition apparatus superimposes the convolution kernel at a location (3, 3) in the feature map. Then, the object recognition apparatus superimposes the convolution kernel at a location (2, 3) in the feature map.

In this way, each AER event in the AER data is superimposed on the feature map, to obtain the feature map of the AER data. The foregoing description is provided by using only one filter with a combination of the scale s and the direction θ as an example, and each filter with a combination of the scale s and the direction θ may obtain one feature map.

It should be noted that, for a boundary location in the feature map, the convolution kernel of the Gabor filter cannot be completely covered into the feature map. Therefore, only a value, in the convolution kernel, that can be covered may be superimposed. For example, the convolution kernel of the Gabor filter is a 3×3 convolution kernel. At a location (1, 1) in the feature map, values in a first column and a first row in the convolution kernel cannot be covered into the feature map, but values in columns and rows except the first column and the first row may be covered into the feature map. Therefore, only the values in the columns and the rows except the first column and the first row are superimposed on the feature map.

It should be further noted that the foregoing process of determining each convolution kernel with a combination of the scale s and the direction θ may be determined by the object recognition apparatus during object recognition. Alternatively, the convolution kernel may be determined by another device. When using the convolution kernel, the object recognition apparatus obtains the convolution kernel from the another device. This is not limited in this embodiment of this application. In addition, in this embodiment of this application, an example in which a horizontal rightward direction is a positive direction of an X axis and a vertical downward direction is a positive direction of a Y axis is used for description.

Figure 6:
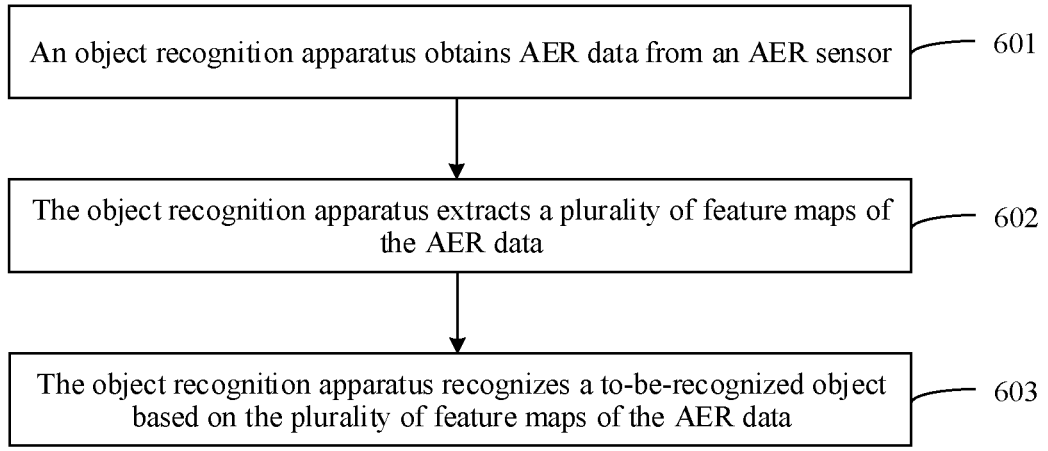
FIG. 6 is a schematic flowchart of an object recognition method according to an example embodiment of this application.

The following describes an object recognition method according to an embodiment of this application with reference to FIG. 6, and an example in which an execution body is an object recognition apparatus is used for description. A method process may be as follows:

Step 601: The object recognition apparatus obtains AER data from an AER sensor, where the AER data includes an AER event from each pixel; because each pixel is used to detect a to-be-recognized object, it may be considered that the AER data includes a plurality of AER events of the to-be-recognized object; and each AER event includes address information of a pixel in which the AER event occurs, a timestamp, and a polarity.

In this embodiment, the AER sensor may detect a change in light intensity of each pixel. When the change exceeds a threshold, an AER event corresponding to the pixel is recorded; and when the change does not exceed the threshold, the AER event corresponding to the pixel is not recorded. Each AER event includes the address information of the pixel in which the AER event occurs, the timestamp, and the polarity. The polarity is used to represent whether a change in light perceived by the pixel is from dark to bright (which may be represented by a value 1) or from light to dark (which may be represented by a value−1). In this way, the AER data includes the plurality of AER events.

When receiving an AER data processing request, the object recognition apparatus may send an AER data obtaining request to the AER sensor to which the AER data belongs. After receiving the AER data obtaining request sent by the object recognition apparatus, the AER sensor may send the AER data to the object recognition apparatus. In this way, the object recognition apparatus may obtain the AER data from the AER sensor.

In addition, an upload period of the AER data is configured in the AER sensor. For each upload period, the AER sensor sends, to the object recognition apparatus, AER data collected in a period from a last upload to the current upload. The object recognition apparatus may receive the AER data sent by the AER sensor. In this way, the object recognition apparatus may also obtain the AER data from the AER sensor.

In addition, each time the AER sensor collects AER data, the AER sensor sends the collected AER data to the object recognition apparatus. In this way, the object recognition apparatus may also obtain the AER data from the AER sensor.

It should be noted that, in this application, AER data in a period of time is obtained, and a to-be-recognized object in the AER data in the period of time is recognized. For example, the period of time is 1 minute. The to-be-recognized object refers to an object whose category or action is not determined in the AER data.

Step 602: The object recognition apparatus extracts a plurality of feature maps of the AER data.

Each feature map includes partial spatial information and partial temporal information of the to-be-recognized object, and the partial spatial information and the partial temporal information are obtained based on the timestamp and the address information of each AER event. The AER data corresponds to the plurality of feature maps, and each feature map includes the partial spatial information and the partial temporal information of the to-be-recognized object. The spatial information is used to indicate a spatial feature of the to-be-recognized object, and the temporal information is used to indicate a temporal feature of the to-be-recognized object.

When extracting the partial spatial information of the to-be-recognized object, the object recognition apparatus may perform extraction by using a convolution operation. When the object recognition apparatus extracts the temporal information, the temporal information may be extracted in a manner in which the spatial information is attenuated with time. In this way, the spatial information is affected by the timestamp of the AER event.

During specific processing, the object recognition apparatus may use a plurality of filters (where none of the plurality of filters is the same, and when the filter is a Gabor filter, the plurality of filters may be filters with a plurality of scales and directions) to process address information of the plurality of AER events in the AER data, to obtain a plurality of first feature maps. Sizes of the plurality of first feature maps are the same. For any first feature map, the object recognition apparatus may attenuate feature values in the first feature map based on timestamps of the plurality of AER events, to obtain a feature map corresponding to the first feature map (where a size of the first feature map is the same as a size of the feature map, the size refers to a quantity of included feature values, and a difference between the first feature map and the feature map only lies in that the feature values are attenuated). The first feature map includes only partial spatial information of the to-be-recognized object, and the feature map includes partial spatial information and partial temporal information of the to-be-recognized object. Because there is a plurality of first feature maps, a plurality of feature maps of the AER data may be obtained. Technical details of step 602 are described in detail below.

Step 603: The object recognition apparatus recognizes the to-be-recognized object based on the plurality of feature maps of the AER data, where the object recognition apparatus may recognize the to-be-recognized object by using a recognition model (such as an SNN), and technical details of step 603 are described in detail below.

Figure 7:
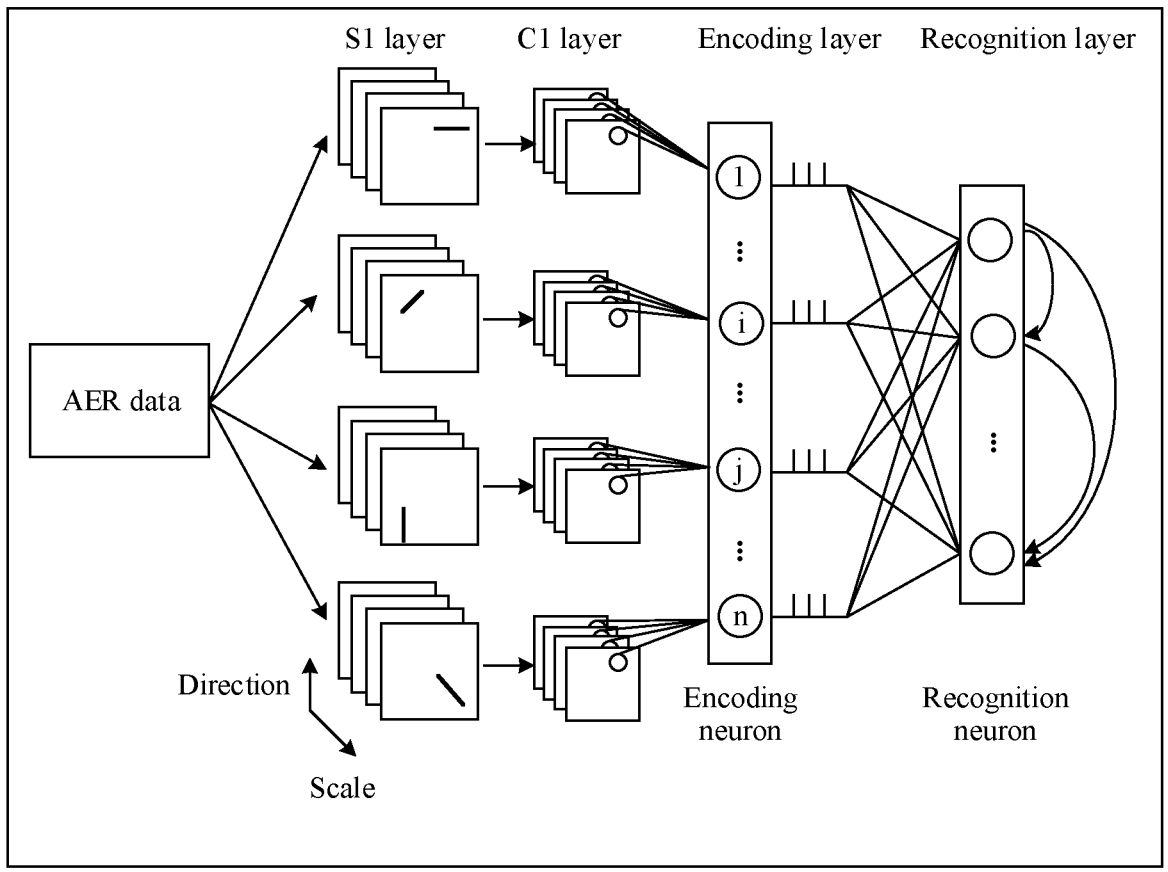
FIG. 7 is a diagram of an implementation architecture of an object recognition method according to an example embodiment of this application.

In this embodiment of this application, a structural diagram of a processing process in which step 602 and step 603 are performed is shown in FIG. 7. The structural diagram includes an S1 layer, a C1 layer, an encoding layer, and a recognition layer. It is assumed that there are 16 filters with combinations of the scale s and the direction θ in this embodiment of this application. In this case, 16 feature maps may be output at the S1 layer based on the AER data. In addition, each feature map has a same size and the size may be equal to a quantity of pixels in the AER sensor. In FIG. 7, feature maps superimposed in a horizontal direction are feature maps with a same direction θ and different scales s (namely, feature maps processed by different filters in the same direction θ). The S1 layer includes, from top to bottom in a vertical direction, feature maps in a 0-degree direction θ, a 45-degree direction θ, a 90-degree direction θ, and a 135-degree direction θ. Dimension reduction processing is performed, at the C1 layer, only on the feature maps output by the S1 layer. Therefore, a quantity of feature maps does not change. The encoding layer is used to perform temporal encoding and spatial encoding processing on the feature maps output by the C1 layer, to obtain a spike train. The recognition layer is used to perform recognition processing on the to-be-recognized object in the AER data based on the spike train.

The S1 layer is used to implement step 602. The C1 layer, the encoding layer, and the recognition layer are used to implement step 603. The following separately describes processing at each layer in detail.

The S1 layer is used when step 602 is implemented. At the S1 layer, the object recognition apparatus performs convolution calculation on each AER event in the AER data by using the filter (where in this embodiment of this application, an example in which the filter is a Gabor filter is used for description). A specific process is as follows:

For any Gabor filter with a combination of the scale s and the direction θ (which may be referred to as any Gabor filter for short), each time the object recognition apparatus obtains address information of an AER event, a convolution kernel corresponding to the Gabor filter may be covered into a receptive field corresponding to a pixel to which the AER event belongs in the feature map (where this processing may be referred to as convolution processing), to update the feature map. Convolution processing is performed on the plurality of AER events, to obtain a first feature map corresponding to the Gabor filter. In addition, to effectively extract the temporal information of the AER data, the object recognition apparatus may attenuate, by using the timestamps of the plurality of AER events, a feature value in the first feature map corresponding to the Gabor filter, and extract a feature map including partial spatial information and partial temporal information of the to-be-recognized object. In other words, impact of an earlier AER event on a feature value in the feature map at a current moment is attenuated, to effectively extract the temporal information of the AER data. Specific processing is as follows: For any location in the first feature map, AER events whose receptive fields cover the location are determined. Then, a feature value at the location is attenuated by using timestamps of these AER events, so that an AER event with a longer time from the current moment has less impact on the feature value in the feature map at the current moment, and an AER event with a shorter time from the current moment has greater impact on the feature value in the feature map at the current moment.

The object recognition apparatus may perform convolution processing on the address information of the plurality of AER events by using each Gabor filter with a combination of the scale s and the direction θ, to obtain a plurality of first feature maps; and separately attenuate feature values in the plurality of first feature maps, to obtain the plurality of feature maps of the AER data.

It should be noted that a quantity of feature values in the first feature map may be the same as the quantity of pixels in the AER sensor, and a quantity of feature values in each row of the first feature map is the same as a quantity of pixels in each row of the AER sensor.

Specifically, the spatial information and the temporal information of the to-be-recognized object may be directly combined by using a formula, as shown in the following:

$$r(x, y, t, s, \theta) = \Sigma_{e \in E(t)} \exp\left(-\frac{t-e_t}{T_{leak}}\right) * G(\Delta x, \Delta y, s, \theta) \quad (2)$$

In the formula (2), r(x, y, t, s, θ) refers to a feature value at a moment t and at a location (x, y) in a feature map corresponding to a Gabor filter whose scale is s and whose direction is 9. Δx=x-$e_x$, Δy=y-$e_y$, and E(t) represents an AER event set including all AER events before (at) the moment t. e represents a specific AER event. ($e_x$, $e_y$) represents a location of a pixel to which the AER event e belongs, and may also be referred to as a location of the AER event e in the feature map. (x-$e_x$) is an offset, in an X direction, between x in the location (x, y) in the feature map and $e_x$ of the AER event e. (y-$e_y$) is an offset, in a Y direction, between y in the location (x, y) in the feature map and $e_y$ of the AER event e.

In the formula (2), an expression of G(Δx, Δy, s, θ) is shown in the formula (1), and represents a value of the AER event e at the location (x, y) in the feature map when the scale of the Gabor filter is s and the direction is 9. The value is a value at the location (x, y), in the feature map, that is correspondingly covered by the convolution kernel when a central location of the convolution kernel overlaps with the location ($e_x$, $e_y$).

In the formula (2), $$\exp\left(-\frac{t-e_t}{T_{leak}}\right)$$

is an attenuation function, represents an attenuation degree, and is related to the timestamp of the AER event. $e_t$ represents the timestamp of the AER event. t represents the current moment. A smaller t-$e_t$ indicates a shorter time between the AER event with the timestamp $e_t$ and the current moment, and a larger value of $$\exp\left(-\frac{t-e_t}{T_{leak}}\right).$$

Inversely, a larger t-$e_t$ indicates a longer time between the AER event with the timestamp $e_t$ and the current moment, and a smaller value of $$\exp\left(-\frac{t-e_t}{T_{leak}}\right).$$

$T_{leak}$ is a preset parameter and is a constant.

In the formula (2), x∈X($e_x$), y∈Y($e_y$). If x∈X($e_x$), y∈Y($e_y$), it indicates that the location (x, y) is in a receptive field of the AER event at the location ($e_x$, $e_y$). If x∉X($e_x$), y∈Y($e_y$), it indicates that the location (x, y) is not in a receptive field of the AER event at the location ($e_x$, $e_y$). If x∈X($e_x$), y∉Y($e_y$), it indicates that the location (x, y) is not in a receptive field of the AER event at the location ($e_x$, $e_y$).

Specifically, a feature value r(x, y, t, s, θ) at the location (x, y) is a sum of products of feature values corresponding to all AER events at the location (x, y) and an attenuation function. All the AER events at the location (x, y) herein refer to AER events whose receptive fields cover the location (x, y). Specifically, two types may be included. One type is an AER event in which a location of a pixel to which the AER event belongs is also (x, y), and the other type is an AER event in which a location of a pixel to which the AER event belongs is not the location (x, y), but a receptive field covers the location (x, y).

For example, if the convolution kernel is a 3×3 convolution kernel, a first row is a11, a12, and a13 from left to right, a second row is a21, a22, and a23 from left to right, and a third row is a31, a32, and a33 from left to right. The location (x, y) in the feature map is (3, 3), and there are two AER events whose locations ($e_x$, $e_y$) are (3, 3) before (at) the moment t: an AER event 1 at 100 ms and an AER event 2 at 200 ms. In this case, the object recognition apparatus first multiplies a22 in the convolution kernel by $$\exp\left(-\frac{t-e_t}{T_{leak}}\right)$$

corresponding to the AER event 1, to obtain a first value, and multiplies a22 in the convolution kernel by $$\exp\left(-\frac{t-e_t}{T_{leak}}\right)$$

corresponding to the AER event 2, to obtain a second value. At the location (3, 3), the location ($e_x$, $e_y$) before (at) the moment t is not (3, 3), but there are two AER events whose receptive fields cover the location (3, 3): an AER event 3 whose location is (2, 2) at 150 ms and an AER event 4 whose location is (4, 4) at 210 ms. When the object recognition apparatus determines that the AER event 3 is at the location (3, 3), a corresponding value in a convolution kernel is a33, and a third value is obtained by multiplying a33 by $$\exp\left(-\frac{t-e_t}{T_{leak}}\right).$$

In addition, when the object recognition apparatus determines that the AER event 4 is at the location (3, 3), a corresponding value in a convolution kernel is a11, and a fourth value is obtained by multiplying a11 by $$\exp\left(-\frac{t-e_t}{T_{leak}}\right).$$

Then, the object recognition apparatus adds the first value, the second value, the third value, and the fourth value to obtain a fifth value. The fifth value is a feature value at the location (3, 3) in the feature map at the moment t. This is merely for clear description of a calculation process of the formula (2). During computer processing, calculation may also be performed in another manner.

In addition, it can be learned from the formula (2) that r(x, y, t, s, θ) is obtained by multiplying two parts: One part is used to reflect the spatial information, namely, G (Δx, Δy, s, θ); and the other part is used to reflect the temporal information, namely, $$\exp\left(-\frac{t-e_t}{T_{leak}}\right).$$

Because $$\exp\left(-\frac{t-e_t}{T_{leak}}\right).$$

is used to attenuate impact of an earlier AER event on the feature value at the current moment, the feature map includes both the spatial information and the temporal information.

In the foregoing description, for the Gabor filter with the combination of the scale s and the direction θ, the feature map corresponding to the Gabor filter with the combination of the scale s and the direction θ is determined. The object recognition apparatus may determine, by using the formula (2), a feature map corresponding to any Gabor filter with a combination of the scale s and the direction θ.

Figure 8:
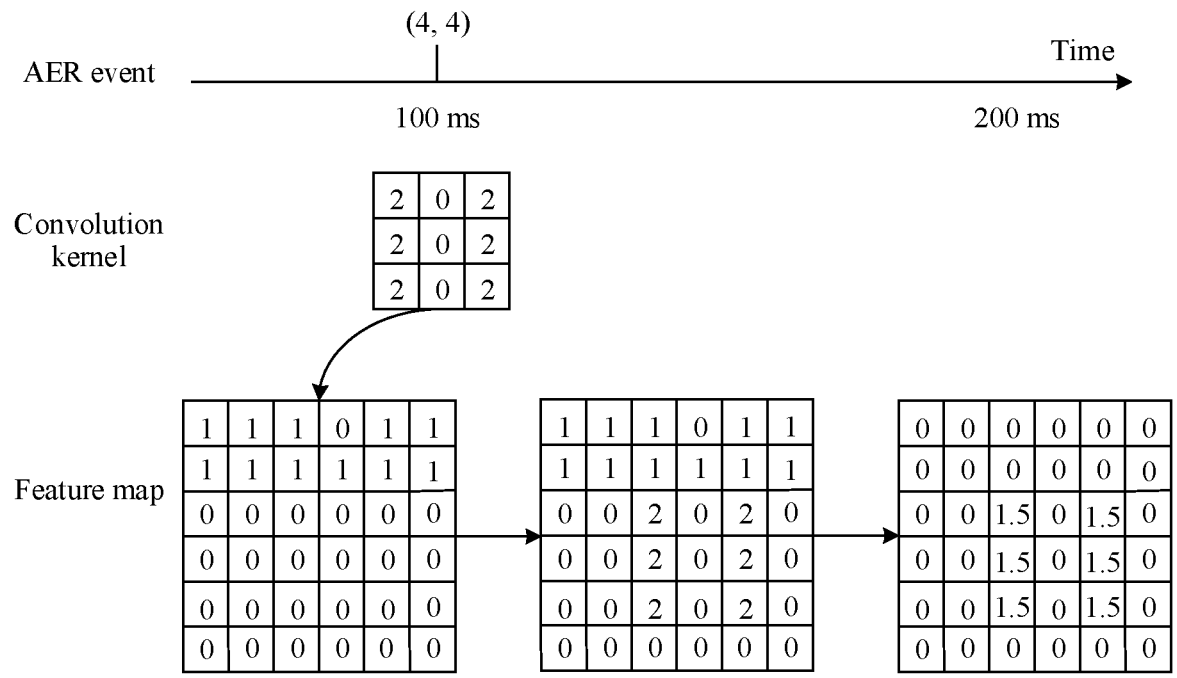
FIG. 8 is a schematic diagram of extracting a feature map according to an example embodiment of this application.

For example, as shown in FIG. 8, it is assumed that the AER sensor includes 6×6 pixels. When the scale s is 3, and the direction θ is 45 degrees, the feature map output in step 602 is 6×6. When no AER event is input, a value at each location in the feature map is 0. An AER event is generated at a location (4, 4) at 100 ms, and a convolution kernel of a Gabor filter whose scale s is 3 and whose direction θ is 45 degrees is covered into a receptive field of the AER event at the location (4, 4) of the feature map. As the time elapses and reaches 200 ms, the feature value in the feature map is attenuated compared with that at 100 ms.

In conclusion, as the time elapses, a feature value corresponding to each pixel in the feature map decreases or increases toward a resting potential. It should be noted that the resting potential is generally 0. A case of decreasing toward the resting potential is that all feature values greater than 0 decrease toward the resting potential 0, for example, change from 1 to 0.5. A case of increasing toward the resting potential is that all feature values less than 0 increase toward the resting potential 0, for example, change from −1 to −0.5.

It should be noted that t in the formula (2) refers to time in the AER data, for example, a fifth second of the AER data or a tenth second of the AER data. In addition, in the foregoing attenuation manner, attenuation as a function of time is performed in an exponential manner. Similarly, attenuation as a function of time may be performed in another manner provided that the spatial information can attenuate with time. This is not limited in this embodiment of this application. In this embodiment of this application, 16 combinations of the scale s and the direction θ may be used, and values of the scale and the direction are shown in Table 1.

TABLE 1

| Scale s | 3 | 5 | 7 | 9 |
|---|---|---|---|---|
| Direction θ | 0 degrees | 45 degrees | 90 degrees | 135 degrees |

In Table 1, because the scale has four values and the direction θ has four values, there are 16 combinations of the scale s and the direction θ. In other words, there are 16 Gabor filters. In this way, each combination of the scale s and the direction θ corresponds to one feature map. Therefore, in this embodiment of this application, 16 feature maps may be output at the S1 layer.

In addition, in this embodiment of this application, a value of γ may be 0.3. When a value of the scale s is 3, a value of σ is 1.2, and a value of λ is 1.5. When a value of the scale s is 5, a value of σ is 2.0, and a value of λ is 2.5. When a value of the scale s is 9, a value of σ is 3.6, and a value of λ is 4.6. When a value of the scales is 7, a value of σ is 2.8, and a value of λ is 3.5.

The C1 layer is used when step 603 is implemented. At the C1 layer, the object recognition apparatus divides each feature map output by the S1 layer into adjacent 2×2 regions. For each feature map, the object recognition apparatus selects a maximum value in each 2×2 region in the feature map, to obtain a new feature map corresponding to the feature map. It can be learned that at the C1 layer, only a dimension of the feature map is changed, but a quantity of feature maps is not changed. For example, there are 16 feature maps output by the S1 layer, and a size of each feature map is 128×128. 16 new feature maps are obtained, and a size of each feature map is 64×64. Processing at the C1 layer may be referred to as a pooling operation.

In this way, through the processing at the C1 layer, the dimension of the feature map can be reduced. Further, a processing amount at the subsequent encoding layer and recognition layer can be reduced. In addition, if a dimension of the feature map output by the S1 layer is relatively small, and the object recognition apparatus has a relatively strong processing capability, the processing at the C1 layer may not be performed.

The encoding layer is used when step 603 is implemented. The encoding layer is used to perform encoding processing on the plurality of feature maps of the AER data. During specific processing, the object recognition apparatus encodes the feature maps of the AER data into a spike train. When the feature map obtained by the any Gabor filter with a combination of the scale s and the direction θ is encoded, the object recognition apparatus performs temporal encoding and spatial encoding. The temporal encoding may be used to perform time sequence encoding processing on each feature value in the feature map according to a target coding function, to obtain a spike time of each feature value in the feature map. The target coding function may be an inverse linear function or an inverse logarithmic function. The spatial encoding is used to form spike times into a spike train.

It should be noted that, during the foregoing temporal encoding, it is considered that a feature with a larger feature value in the feature map generates a spike more easily, and corresponds to a minimum delay time, thereby triggering a spike first; and a feature with a smaller feature value in the feature map triggers a spike later or even does not trigger a spike. Therefore, based on this principle, the target coding function is an inverse logarithmic function or an inverse linear function. The inverse logarithmic function may be u−vln(r) (which is described later). The inverse linear function may be kr+b (where k is a number less than 0). In addition, because the inverse logarithmic function or the inverse linear function changes distribution of the feature values in the feature map, the feature values can express more information at the subsequent recognition layer, and recognition accuracy can be improved.

The following separately describes the temporal encoding and the spatial encoding.

Temporal encoding: For any feature map A, in this embodiment of this application, the temporal encoding is described by using an example in which the target coding function is an inverse logarithmic function, and a function expression may be:

$$t=C(r)=u-v\ln(r) \qquad (3)$$

In the formula (3), r is a feature value at any location, and t is a spike time whose feature value is r. u and v are normalization factors used to ensure that spikes corresponding to all feature values in a feature map are excited in a predetermined time window tw. For example, tw is 120 ms. C( ) represents the target coding function.

u and v may be determined in the following manner:

$$\begin{cases} u = tw * \ln(r_{max})/(\ln(r_{max}) - \ln(r_{min})) \\ v = tw/(\ln(r_{max}) - \ln(r_{min})) \end{cases} \quad (4)$$

For the feature map A, $r_{max}$ is a maximum feature value in the feature map A, and $r_{min}$ is a predefined minimum threshold. It should be noted herein that $r_{max}$ and $r_{min}$ in each feature map may be different. Therefore, when temporal encoding is performed on a different feature map, $r_{max}$ and $r_{min}$ need to be re-determined.

Through the temporal encoding, the object recognition apparatus encodes the feature value in each feature map into a spike time. In other words, each feature value in each feature map corresponds to one spike time. For example, there are 16 feature maps, and each feature map has 64×64 feature values. Therefore, there is a total of 16×64×64 of spike times.

In addition, because the smaller feature value in the feature map may not trigger a spike, before performing temporal encoding, the object recognition apparatus may delete a feature value less than a target threshold (where the target threshold is $r_{min}$) in the feature map, to reduce processing resources. Correspondingly, during subsequent spatial encoding, there is no need to collect statistics on spike times of feature values less than the target threshold. Therefore, processing resources can also be reduced.

Spatial encoding: When the object recognition apparatus performs spatial encoding, the object recognition apparatus may fuse some feature values to more effectively use neurons to form a compact representation, so as to reduce a calculation amount at the subsequent recognition layer. Specifically, feature values, of all scales s in a specified direction, at same locations in the feature maps output by the C1 layer form a group of feature values (where the specified direction refers to a fixed direction in a plurality of directions θ, and in this embodiment of this application, the specified direction may be any one of 0 degrees, 45 degrees, 90 degrees, or 135 degrees). For example, 16 feature maps are output at the C1 layer. The 16 feature maps may be divided into feature maps in four directions. There are four feature maps (namely, feature maps with four scales) in each direction. Values at locations (2,2) in four feature maps whose specified directions are 0 degrees are 3, 4, 5, and 5. Therefore, a group of feature values at same locations (2, 2) in the specified direction of 0 degrees is (3, 4, 5, 5).

Then, the object recognition apparatus forms, into a group, feature values at same locations (for example, the same location is (2, 2)) in the feature maps in the specified direction of 0 degrees. In other words, the group of feature values including the four feature values at the locations (2, 2) in the specified direction of 0 degrees are obtained. Then, spike times corresponding to each group of feature values are obtained. In this way, the spike times corresponding to each group of feature values form a spike train. Because there is a plurality of groups of feature values, a plurality of spike trains can be obtained.

In this embodiment of this application, the encoding layer may include a plurality of encoding neurons, and each encoding neuron is responsible for conversion of feature maps, of a plurality of scales s in a specified direction, at same locations. A quantity of encoding neurons may be N×P×M (where N may be or may not be equal to P). N×P is a size of a feature map (a feature map output by the C1 layer), and M is a quantity of directions θ.

After the foregoing analysis, the spatial encoding and the temporal encoding are combined, and the formula (3) may be expressed as:

$$t_{spike}=C(r|x,y,s,\theta)=u-v\ln(r) \quad (5)$$

$r \in \{r | r_x = x, r_y = y, r_s \in S, r_\theta = \theta\}$. $r_s$ represents a scale of the feature value r, S represents a set of scales s, $r_\theta$ represents a direction of the feature value r, and $r_x$ and $r_y$ represent a location of the feature value r in the feature map. A function of the formula (5) indicates a $t_{spike}$ set generated based on spike times of all scales in the direction θ at the location (x, y).

In this way, for each location in the feature map, spike times of all scales in four directions (namely, Gabor filters in the four directions) may be obtained. For example, a size of the feature map is 64×64, the direction has four values (0 degrees, 45 degrees, 90 degrees, and 135 degrees), the scale s also has four values (3, 5, 7, 9), and there are 16 feature maps. For each location in the feature map, there are spike trains corresponding to the four directions, and the spike train corresponding to each direction includes spike times corresponding to four scales. Therefore, there are a total of 64×64×4 spike trains.

In this way, the spike time in the spike train is obtained based on the feature value in the feature map. Because each feature value reflects partial spatial information and partial temporal information of the to-be-recognized object, the spike in the spike train also carries the partial spatial information and the partial temporal information of the to-be-recognized object.

It should be noted that, because spikes of different scales are fused at the encoding layer, a quantity of parameters at the subsequent recognition layer can be reduced but accuracy is maintained. This is very suitable for a resource-limited neuro-simulation device.

The recognition layer is also used when step 603 is implemented. The recognition layer is used to receive the spike train output by the encoding layer, and recognize the to-be-recognized object in the AER data. The recognition layer may be implemented as an SNN. The SNN is a fully-connected network structure. A quantity of neurons (namely, recognition neurons mentioned later) included in the SNN is equal to N×P×M (where N may be or may not be equal to P). N×P is a size of a feature map (a feature map output by the C1 layer), and M is a quantity of directions θ.

After obtaining the output of the encoding layer, the object recognition apparatus may input each spike train into each recognition neuron in the recognition layer. The object in the AER data may be obtained through recognition processing at the recognition layer.

In addition, this embodiment of this application further provides an SNN training method, and processing may be as follows:

The SNN training method may include a supervised learning algorithm and an unsupervised learning algorithm. The supervised learning algorithm may be a Multi-Spike Prop algorithm or the like. The unsupervised learning algorithm may be an STDP algorithm or the like. In this application, the STDP algorithm is used an example to perform SNN training. Based on a relative time sequence relationship between a spike train fired by a presynaptic neuron and a spike train fired by a postsynaptic neuron, an unsupervised adjustment may be performed on a synaptic weight value by using a learning rule of the STDP algorithm. A training process may be as follows:

Step a: Obtain a sample set, where the sample set includes AER data, and the AER data includes a plurality of AER events.

Step b: Process the plurality of AER events through the foregoing feature extraction, to obtain a feature map.

Step c: Encode the feature map by using an encoding neuron to obtain a spike train (where this step is performed in the foregoing manner).

Step d: Input the spike train into a recognition layer, to stimulate a recognition neuron to fire a spike. The STDP algorithm is used to adjust a synaptic weight based on a time interval between firing a spike by the encoding neuron and firing a spike by the recognition neuron. If the spike fired by the encoding neuron precedes the spike of the recognition neuron, the weight is increased. Otherwise, the weight is decreased. At the same time, a dynamic threshold is used for the recognition neuron. To be specific, if the recognition neuron frequently triggers a spike, a threshold of the recognition threshold is increased. Recognition neurons are connected to each other and inhibit each other.

Step e: After step b to step d for a target quantity of times (where the target quantity of times may be 5 to 10) are performed, end the training. A learning rate is set to zero, and a threshold of each recognition neuron and a weight of each synapse when step d is performed for a last time are determined. Each recognition neuron is assigned a category based on a highest response of the recognition neuron to a sample category in the sample set (where this is the only step for using a label).

In a subsequent use process, a category with a highest excitation rate may be selected as a prediction result based on a response of each recognition neuron to which the category is assigned.

In this embodiment of this application, the object recognition apparatus may obtain the AER data of the to-be-recognized object, where the AER data includes the plurality of AER events of the to-be-recognized object, and each AER event includes the timestamp and the address information that are used for generating the AER event; then, extract the plurality of feature maps of the AER data, where each feature map includes the partial spatial information and the partial temporal information of the to-be-recognized object, and the partial spatial information and the partial temporal information are obtained based on the timestamp and the address information of each AER event; and finally recognize the to-be-recognized object based on the plurality of feature maps of the AER data. In this way, because both temporal information and spatial information of the to-be-recognized object in the AER data are included in the extracted feature maps, the feature maps can more comprehensively represent original data, and a recognition result can be more accurate during recognition.

In addition, in this embodiment of this application, a spike coding manner is used. Therefore, more information can be expressed in a subsequent recognition model, thereby improving recognition accuracy. Moreover, because spikes with different scales are fused, a quantity of recognition neurons can be reduced but the accuracy is maintained, to further reduce computing resources.

Figure 9:
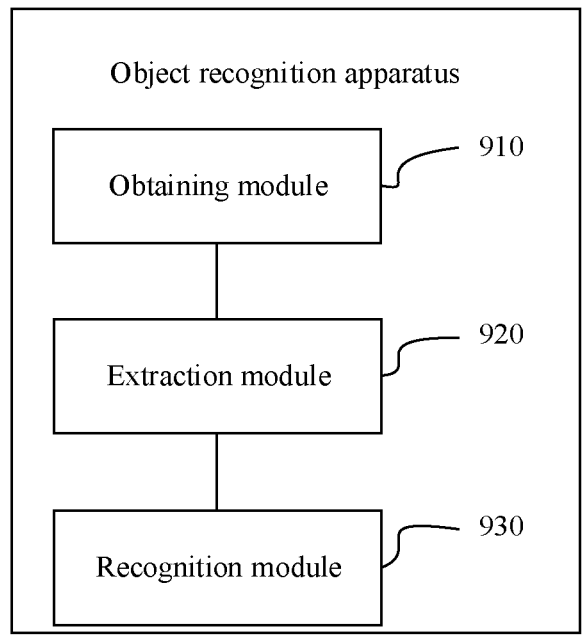
FIG. 9 is a schematic structural diagram of an object recognition apparatus according to an example embodiment of this application.

FIG. 9 is a structural diagram of an object recognition apparatus according to an embodiment of this application. The apparatus may be implemented as a part of the apparatus or the entire apparatus by using software, hardware, or a combination thereof. The apparatus provided in this embodiment of this application may implement the process in the embodiment of this application shown in FIG. 6. The apparatus includes an obtaining module 910, an extraction module 920, and a recognition module 930.

The obtaining module 910 is configured to obtain address event representation AER data of a to-be-recognized object. The AER data includes a plurality of AER events of the to-be-recognized object, and each AER event includes a timestamp and address information that are used for generating the AER event. The obtaining module 910 may be specifically configured to perform an obtaining function for implementing step 601.

The extraction module 920 is configured to extract a plurality of feature maps of the AER data. Each feature map includes partial spatial information and partial temporal information of the to-be-recognized object, and the partial spatial information and the partial temporal information are obtained based on the timestamp and the address information of each AER event. The extraction module 920 may be specifically configured to perform an extraction function for implementing step 602 and perform an implicit step included in step 602.

The recognition module 930 is configured to recognize the to-be-recognized object based on the plurality of feature maps of the AER data. The recognition module 930 may be specifically configured to perform a recognition function for implementing step 603 and perform an implicit step included in step 603.

In a possible implementation, the extraction module 920 is configured to:
process address information of the plurality of AER events by using a plurality of filters, to obtain a plurality of first feature maps; and
attenuate feature values in the plurality of first feature maps based on timestamps of the plurality of AER events, to obtain the plurality of feature maps of the AER data.

In a possible implementation, the extraction module 920 is configured to:
perform convolution processing on spatial information of the plurality of AER events by using convolution kernels of a plurality of Gabor filters, to obtain the plurality of first feature maps.

In a possible implementation, the recognition module 930 is configured to:
encode the plurality of feature maps of the AER data to obtain a plurality of spike trains, where each spike train includes a plurality of spikes, each spike carries partial temporal information and partial spatial information of the to-be-recognized object, and a plurality of spikes belonging to a same spike train are obtained based on feature values at same locations in feature maps corresponding to different filters that are in a same specified direction; and
process the plurality of spike trains by using a spiking neural network, to recognize the to-be-recognized object.

In a possible implementation, the recognition module 930 is configured to:
encode the plurality of feature maps of the AER data by using a target coding function, to obtain the plurality of spike trains, where the target coding function is an inverse linear function or an inverse logarithmic function.

In this embodiment of this application, the object recognition apparatus may obtain the AER data of the to-be-recognized object, where the AER data includes the plurality of AER events of the to-be-recognized object, and each AER event includes the timestamp and the address information that are used for generating the AER event; then, extract the plurality of feature maps of the AER data, where each feature map includes the partial spatial information and the partial temporal information of the to-be-recognized object, and the partial spatial information and the partial temporal information are obtained based on the timestamp and the address information of each AER event; and finally recognize the to-be-recognized object based on the plurality of feature maps of the AER data. In this way, because both temporal information and spatial information of the to-be-recognized object in the AER data are included in the extracted feature maps, the feature maps can more comprehensively represent original data, and a recognition result can be more accurate during recognition.

In addition, in this embodiment of this application, a spike coding manner is used. Therefore, more information can be expressed in a subsequent recognition model, thereby improving recognition accuracy. Moreover, because spikes with different scales are fused, a quantity of recognition neurons can be reduced but the accuracy is maintained, to further reduce computing resources.

It should be noted that, when the object recognition apparatus provided in the foregoing embodiment recognizes an object, division of the foregoing function modules is merely used as an example for description. In actual application, the foregoing functions may be allocated to different function modules and implemented according to a requirement. In other words, an internal structure of the apparatus may be divided into different function modules to implement all or some of the functions described above. In addition, the object recognition apparatus provided in the foregoing embodiment is based on a same concept as the embodiment of the object recognition method. For a specific implementation process, refer to the method embodiment, and details are not described herein again.

This embodiment further provides an object recognition computing device. The computing device includes a processor and a memory. The memory is configured to store one or more instructions, and the processor executes the one or more instructions to implement the provided object recognition method.

This embodiment further provides a computer-readable storage medium. The computer-readable storage medium stores instructions. When the instructions in the computer-readable storage medium are executed on a computing device, the computing device is enabled to perform the provided object recognition method.

This embodiment further provides a computer program product including instructions. When the computer program product runs on a computing device, the computing device is enabled to perform the provided object recognition method, or the computing device is enabled to implement a function of the provided object recognition apparatus.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, a magnetic tape), an optical medium (for example, a digital video disk (DVD)), a semiconductor medium (for example, a solid-state drive).

It may be understood that the described apparatus embodiment is merely an example. For example, division into the modules is merely logical function division and may be other division in an actual implementation. For example, a plurality of modules or components may be combined or integrated into another system, or some features may be ignored or not performed. In addition, connections between the modules discussed in the foregoing embodiment may be implemented in an electrical form, a mechanical form, or another form. The modules described as separate components may or may not be physically separate. A component displayed as a module may or may not be a physical module. In addition, function modules in the embodiments of this application may exist independently, or may be integrated into one processing module.

It should be noted that the embodiments provided in this application are merely examples. A person skilled in the art may clearly know that, for convenience and conciseness of description, in the foregoing embodiments, the embodiments emphasize different aspects, and for a part not described in detail in an embodiment, refer to related description of another embodiment. The features disclosed in the embodiments of the present invention, claims, and the accompanying drawings may exist independently or exist in a combination. Features described in a hardware form in the embodiments of the present invention may be executed by software, and vice versa. This is not limited herein.

What is claimed is:

1. An object recognition method comprising:
    obtaining address event representation (AER) data of a to-be-recognized object, wherein the AER data comprises a plurality of AER events of the to-be-recognized object, and each AER event comprises a timestamp and address information;
    extracting a plurality of feature maps of the AER data, wherein each feature map comprises partial spatial information and partial temporal information of the to-be-recognized object, and the partial spatial information and the partial temporal information are obtained based on the timestamp and the address information of each AER event; and
    recognizing the to-be-recognized object based on the plurality of feature maps of the AER data,
    wherein the step of extracting the plurality of feature maps of the AER data comprises:
    processing address information of the plurality of AER events, by using a plurality of filters, to obtain a plurality of first feature maps; and
    attenuating, as a function of time, feature values in the plurality of first feature maps based on timestamps of the plurality of AER events, to obtain the plurality of feature maps of the AER data.

2. The method according to claim 1, wherein the step of processing address information of the plurality of AER events comprises:

performing convolution processing on spatial information of the plurality of AER events by using convolution kernels of a plurality of Gabor filters to obtain the plurality of first feature maps.

3. The method according to claim 1, wherein the step of recognizing the to-be-recognized object comprises:

encoding the plurality of feature maps of the AER data to obtain a plurality of spike trains, wherein each spike train comprises a plurality of spikes, each spike carries partial temporal information and partial spatial information of the to-be-recognized object, and a plurality of spikes belonging to a same spike train are obtained based on feature values at same locations in feature maps corresponding to different filters that are in a same specified direction; and processing the plurality of spike trains by using a spiking neural network, to recognize the to-be-recognized object.

4. The method according to claim 3, wherein the step of encoding the plurality of feature maps of the AER data to obtain the plurality of spike trains comprises:

encoding the plurality of feature maps of the AER data by using a target coding function to obtain the plurality of spike trains, wherein the target coding function is an inverse linear function or an inverse logarithmic function.

5. An object recognition apparatus comprising:

an interface for receiving address event representation (AER) data from an AER sensor;

a processor configured to perform operations of:

obtaining, from the AER sensor via the interface, AER data of a to-be-recognized object, wherein the AER data comprises a plurality of AER events of the to-be-recognized object, and each AER event comprises a timestamp and address information;

extracting a plurality of feature maps of the AER data, wherein each feature map comprises partial spatial information and partial temporal information of the to-be-recognized object, and the partial spatial information and the partial temporal information are obtained based on the timestamp and the address information of each AER event; and recognizing the to-be-recognized object based on the plurality of feature maps of the AER data, wherein the operation of extracting the plurality of feature comprises:

processing address information of the plurality of AER events by using a plurality of filters, to obtain a plurality of first feature maps; and attenuating, as a function of time, feature values in the plurality of first feature maps based on timestamps of the plurality of AER events, to obtain the plurality of feature maps of the AER data.

6. The apparatus according to claim 5, wherein the operation of processing the address information of the plurality of AER events comprises:

performing convolution processing on spatial information of the plurality of AER events by using convolution kernels of a plurality of Gabor filters, to obtain the plurality of first feature maps.

7. The apparatus according to claim 5, wherein the operation of recognizing the to-be-recognized object comprises:

encoding the plurality of feature maps of the AER data to obtain a plurality of spike trains, wherein each spike train comprises a plurality of spikes, each spike carries partial temporal information and partial spatial information of the to-be-recognized object, and a plurality of spikes belonging to a same spike train are obtained based on feature values at same locations in feature maps corresponding to different filters that are in a same specified direction; and processing the plurality of spike trains by using a spiking neural network, to recognize the to-be-recognized object.

8. The apparatus according to claim 7, wherein the operation of encoding the plurality of feature maps of the AER data to obtain the plurality of spike trains comprises:

encoding the plurality of feature maps of the AER data by using a target coding function, to obtain the plurality of spike trains, wherein the target coding function is an inverse linear function or an inverse logarithmic function.

* * * * *